Feb. 13, 1968   J. KUFFERATH   3,368,663
MESH FABRIC
Filed Sept. 12, 1966

INVENTOR
Josef Kufferath
BY
Michael J. Striker
Atty.

3,368,663
MESH FABRIC
Josef Kufferath, Mariaweiler, near Duren, Germany
Filed Sept. 12, 1966, Ser. No. 578,677
Claims priority, application Germany, Sept. 14, 1965,
K 57,122
14 Claims. (Cl. 198—193)

ABSTRACT OF THE DISCLOSURE

A mesh-fabric conveyor belt. Warp wires extending parallel to one another transversely spaced. Weft wires, which connect the warp wires, each consist of straight coaxially arranged wire portions located intermediate the warp wires all substantially in one plane on one side of the warp wires, and these weft wires further comprising kinked portions connecting the straight portions and located at points of intersection with the warp wires, all kinked portions projecting to the other side of the plane.

---

The present invention relates to a mesh fabric, and more particularly to a mesh fabric for conveyor belts and the like. The invention also relates to a conveyor arrangement utilizing such mesh fabric.

The use of belt-type conveyors for transporting materials of many different kinds is well-known, and the art pertaining to it is highly developed. It is also well known that the belts of such conveyors may be made from various different materials, depending on the type of goods to be carried on the belt. For instance, certain materials are best carried on a rubber belt or on a belt containing rubber or a substitute synthetic plastic material. Other materials are carried on webbing belts and still other materials, particularly materials which are very heavy and/or of jagged configuration, may require the use of belts which consist of mesh-type fabric, usually wire mesh which is very resistant to damage.

It is to this latter type of conveyor arrangement, namely the type utilizing mesh-fabric belts, that the present invention addresses itself. Belts of mesh fabric, as indeed belts of any type of material, have a tendency to slip in axial direction of the rollers over which they are guided. To prevent this it is necessary to provide special control and guidance devices which considerably increase the expense of the conveyor arrangement. If the belt is to be guided in a complicated path, that is if it is to be guided about several rollers causing it to change direction several times, it is usually even necessary to provide several such guidance and control devices with the result that the arrangement becomes rather complicated and very expensive.

Attempts have been made to overcome this problem by replacing the control devices with guide ribs, usually strips of rubber which are secured to one side of the belt at one or both edges thereof and which cooperate with recesses provided in the guide rollers and are thus utilized for preventing axial slippage of the belt on these rollers. However, in this type of arrangement securing of these guide strips to the belt is not always easy and reliable, and in any case it requires an additional operating step during fabrication of the belt thus increasing the cost of the latter. Furthermore, the flexibility of the belt, a feature which is particularly vital if the belt is to traverse a complicated path, is adversely influenced by the provision of such guide strips.

For all of these reasons industry has long sought to provide a belt for conveyors which is not subject to axial slippage on the guide rollers of the conveyor arrangement, which is inexpensive to manufacture and capable of withstanding hard use, and which additionally retains maximum flexibility.

It is therefore a general object of the present invention to provide a conveyor belt which is not subject to the disadvantages outlined above with respect to the prior art.

A more specific object of the invention is to provide such a belt which includes guide means for preventing the belt from slipping in axial direction of its respective guide rollers.

Another object of the invention is to provide a belt of the type outlined above which is inexpensive to construct and which is possessed of maximum flexibility.

A further object of the invention is to provide a conveyor arrangement utilizing such a belt.

In accordance with one feature of my invention I provide a wire mesh fabric for conveyors or the like which comprises a plurality of spaced substantially parallel warp wires and transversely arranged shape-retaining weft wires. Each of the weft wires is composed of straight axially arranged wire portions all of which extend substantially in one plane on one side of the warp wires, and each of the weft wires further comprises kinked portions which connect the straight portions and which are located at the points of intersection of the weft wires with corresponding ones of the warp wires. The kinked portions project to the other side of the above-mentioned plane and extend around the warp wires interweaving the same with the weft wires in such a manner that the resulting fabric has a substantially planar surface which is formed by the straight portions of the weft wires, and furthermore an oppositely directed second surface which is provided with ridges extending in longitudinal direction of the warp wires and formed by longitudinally aligned kinked portions of successive ones of the weft wires. These ridges are adapted to be received in peripheral guide depressions of support members for the fabric so as to prevent transverse slippage of the latter relative to such support members.

A conveyor arrangement utilizing such a fabric comprises, in accordance with another feature of my invention, an article-supporting wire mesh fabric which includes again the plurality of substantially parallel spaced warp wires as well as transversely arranged shape-retaining weft wires, each of the weft wires being composed of straight coaxially arranged wire portions and all of these wire portions extending substantially in one plane on one side of the warp wires. Again, each of the weft wires further comprises kinked portions connecting the straight portions and being located at points of intersection with corresponding ones of the warp wires, such kinked portions projecting to the other side of the above-mentioned plane and extending around the warp wires, interweaving the same with the weft wires in such a manner that the resulting fabric has a substantially planar surface formed by the straight portions of the weft wires and an oppositely directed second surface which is provided with ridges extending in longitudinally direction of the warp wires and formed by longitudinally aligned kinked portions of successive ones of the weft wires. Thus far, the arrangement utilizes the wires mesh fabric set forth earlier in this specification. Additionally, however, the arrangement includes a pair of support members over which the fabric is guided for movement in a given direction, and such separate members are provided with recesses which are configurated and arranged to receive hte ridges of the fabric so as to thereby prevent slippage of the latter transversely of the given direction of movement.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
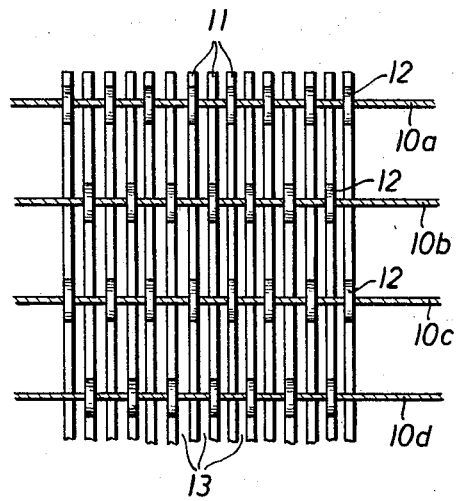
FIG. 1 is a fragmentary view of a wire mesh fabric in accordance with the present invention as seen from one side thereof.

Discussing now the drawing in detail, and firstly FIG. 1 thereof, it will be seen that the wire mesh fabric shown therein comprises a plurality of substantially parallel elongated warp wires 10a, 10b, 10c, 10d, etc. The figure shows that these wires are spaced relatively far from one another; however, this transverse spacing can be provided at any desired distance. The wires 10a–10d are joined together by weft wires 11. In accordance with the invention each of the weft wires 11 comprises a plurality of longitudinally spaced straight coaxially arranged wire portions 16 which all extend substantially in one plane on one side of the warp wires 10a–10d, as is most clearly evident in FIGS. 1 and 3. The wire portions 16 are joined by kinked portions which connect the straight portions and the straight portions are of such length that the respective kinked portions coincide with the points of intersection of the weft wires with the warp wires. It is to be noted that the kinked portions always extend to the other side of the plane mentioned above. In consecutive ones of the weft wires 11 the kinked portions are transversely offset with reference to the elongation of the warp wires so that each warp wire will alternately extend through a kinked portion 12 and subsequently underneath a straight portion 16 of the consecutive weft wire. This assures that the wire fabric has proper cohesion. With this arrangement it will be understood that one surface of the resulting fabric, namely that at which the straight portions of the weft threads 11 are located, will be substantially planar whereas the other surface will be provided with a plurality of ridges extending in longitudinal direction of the warp wires 10a–10d. These ridges are constituted by consecutive aligned kinked portions of the respective wift wires. It is these ridges which serve, in accordance with the invention, for guiding the wire mesh fabric and for preventing its displacement or shifting in axial direction of the supporting rollers on which the wire mesh fabric, that is in the example the belt, is supported. This is clearly evident in FIG. 1 of the drawing.

Figure 2:
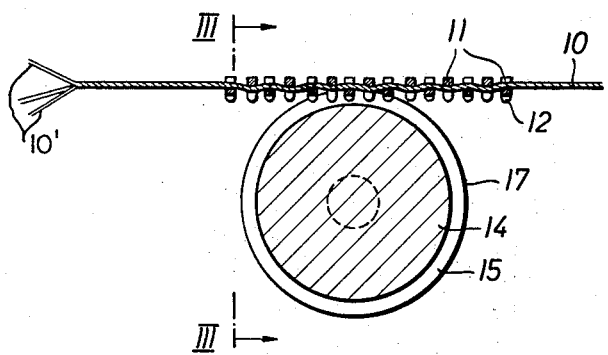
FIG. 2 is lateral view of a wire mesh fabric supported on and guided by a support member.
Figure 3:
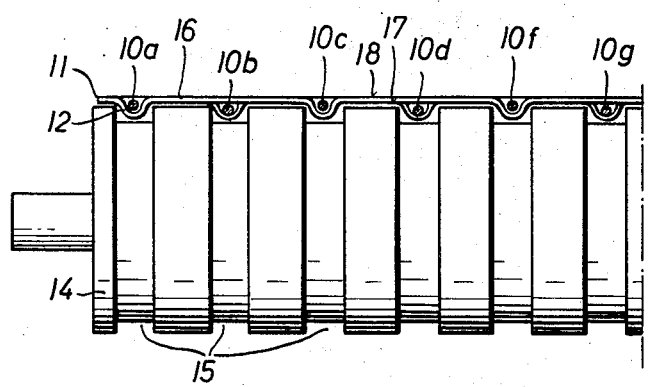
FIG. 3 is a partly sectioned view as taken on the line III—III of FIG. 2.

FIGS. 2 and 3 show how a fabric constructed in accordance with the present invention is supported by a guide roller and prevented from axial movement relative to the same. The guide roller is identified with reference numeral 14 and it will be seen that it has a peripheral wall 17 provided with a plurality of annular peripheral grooves 15 therein, the number of such grooves 15 corresponding to the number of ridges constituted by the various kinked portions of the weft threads. It is to be noted that the annular peripheral grooves 15 of the roller or rollers 14 are spaced from one another in axial direction of the roller by a distance corresponding to the distance between the mid-points of consecutive ones of the kinked portions 12. Furthermore, the transverse dimensions of these grooves 15 must be at least equal, and preferably slightly larger than the corresponding dimension of the kinked portions 12 so that the same can be freely received in the grooves 15. This is also true of the depth of these grooves since it is not desired that the kinked portions 12 engage the bottoms of the respective groove 15 which would result in undesirable friction.

It will be evident from the drawing and from what has been said before that this arrangement clearly and reliably prevents axially shifting of thus-constructed wire fabric, for instance a conveyor belt, relative to the supporting rollers. Furthermore, the straight portions 16 of the weft threads will always engage the peripheral surface of the peripheral wall 17 of the rollers 14 over their entire length so that the surface-to-surface contact between belt and rollers is increased, resulting in enhancement of the transmission of driving forces between roller and belt. Furthermore, the increased surface-to-surface contact achieved thereby provides vastly better support for the belt so that the same is capable of carrying heavier loads and so that the material carried by the belt may be subjected to a certain amount of pressure, if this is desired, without adversely affecting the structure of the belt.

Advantageously, and in accordance with another feature of the invention, some or all of the warp and weft threads will consist of twisted wires, and preferably of stranded wires, that is of wires consisting of individual filaments which are twisted together. Wires of this type are particularly flexible and a fabric or belt constructed from such wires can be guided about rollers of relatively small diameter without any difficulty.

It is also to be noted that the term "wires" here encompasses not only members of metallic material, but also members of synthetic plastic material, the qualification being that in either instance the material must be shape-retaining since it is of course necessary that the bulges or projections constituted by the kinked portions of the weft wires be retained throughout the life of the belt. Obviously, if the weft wires could be readily stretched such bulges or kinks would disappear and the belt could then perform axial movements relative to the supporting rollers, a possibility which is clearly not desirable. However, the use of shape-retaining material guarantees that this does not take place.

Finally, it should be pointed out that the invention can be utilized for constructing mesh fabrics of any desired configuration and is not limited to the manufacture of conveyor belts per se. Also, such fabrics need not be supported or guided by rollers, such as the ones shown in the drawing, since other members can be readily substituted for these as long as the necessary recesses are provided in which the ridges consisting of the kinked portions can be guided.

It will be understood that each of the elements described above, or two or more together, may also find a useful application in other types of mesh fabrics and conveyor arrangements differing from the types described above.

While the invention has been illustrated and described as embodied in a mesh fabric and in a conveyor arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A wire mesh fabric for conveyors or the like comprising, in combination, a plurality of spaced substantially parallel warp wires an dtransversely arranged shape-retaining weft wires, each of said weft wires being composed of straight coaxially arranged wire portions, all of said wire portions extending substantially in one plane on one side of said warp wires and each of said weft wires further comprising kinked portions connecting said straight portions located at points of intersection with corresponding ones of said warp wires, said kinked portions all projecting to the other side of said plane and extending around said warp wires interweaving the same with said weft wires, the kinked portions of consecutive ones of said weft wires being staggered transversely of the direction of elongation of said warp wires in such a manner that each of said warp wires extends alternately through a kink in one of said weft wires and below a straight wire portion of the consecutive weft wire, whereby the resulting fabric has a substantially planar surface formed by said straight portions of said weft wires and an oppositely directed second surface provided with ridges extending in longitudinal direction of said warp wires and formed by longitudinally aligned kinked portions of successive ones of said weft wires, said ridges being adapted to be received in peripheral guide depressions of support members for said fabric to prevent trensverse slippage of the latter relative to said support members.

2. A wire mesh fabric as defined in claim 1, wherein said warp wires are spaced from one another by a predetermined distance, and wherein the spacing of consecutive kinked portions on each of said weft wires corresponds to said predetermined distance.

3. A wire mesh fabric as defined in claim 1, wherein at least the respective warp wires are twisted.

4. A wire mesh fabric as defined in claim 1, wherein at least the respective warp wires consist of a plurality of strands twisted together.

5. A wire mesh fabric as defined in claim 1, wherein at least some of said wires consist of metallic material.

6. A wire mesh fabric as defined in claim 1, wherein at least some of said wires consist of flexible synthetic plastic material.

7. A conveyor arrangement comprising, in combination, an article-supporting wire mesh fabric including a plurality of spaced substantially parallel warp wires and transversely arranged shape-retaining weft wires, each of said weft wires being composed of straight coaxially arranged wire portions, all of said wire portions extending substantially in one plane on one side of said warp wires and each of said weft wires further comprising kinked portions connecting said straight portions located at points of intersection with corresponding ones of said warp wires, said kinked portions all projecting to the other side of said plane and extending around said warp wires interweaving the same with said weft wires, the kinked portions of consecutive ones of said weft wires being staggered transversely of the direction of elongation of said warp wires in such a manner that each of said warp wires extends alternately through a kink in one of said weft wires and below a straight wire portion of the consecutive weft wire, whereby the resulting fabric has a substantially planar surface formed by said straight portions of said weft wires and an oppositely directed second surface provided with ridges extending in longitudinal direction of said warp wires and formed by longitudinally aligned kinked portions of successive ones of said weft wires; and a pair of support members over which said fabric is guided for movement in a given direction, said support members being provided with recesses configurated and arranged to receive said ridges of said fabric so as to thereby prevent slippage of the latter transversely of said given direction.

8. A conveyor arrangement as defined in claim 7, wherein the kinked portions of each of said weft wires are spaced from each other by a given distance, and wherein said recesses of said support members are spaced from one another in transverse direction by said given distance.

9. A conveyor arrangement as defined in claim 8, wherein said recesses have a transverse dimension slightly greater than the corresponding dimensions of said kinked portions as seen in axial direction of the respective weft wires.

10. A conveyor arrangement as defined in claim 8, wherein said support members are rollers, and wherein said recesses are annular and are provided in the peripheral faces of the respective rollers.

11. A conveyor arrangement as defined in claim 10, wherein said recesses are of such depth that said straight portions of said weft wires engage the peripheral faces of the respective rollers when said ridges are received in the corresponding recesses of said rollers.

12. A conveyor arrangement as defined in claim 7, wherein at least some of said wires consist of a plurality of strands twisted together.

13. A conveyor arrangement as defined in claim 8, wherein at least some of said wires consist of metallic material.

14. A conveyor arrangement as defined in claim 8, wherein at least some of said wires consist of flexible synthetic plastic material.

References Cited

UNITED STATES PATENTS

| 2,236,205 | 3/1941 | Wright | 190—202 |
| 2,855,093 | 10/1958 | Ek | 198—193 |
| 3,154,459 | 10/1964 | Cranston | 198—193 |
| 3,225,900 | 12/1965 | Mac Bean | 198—193 |

FOREIGN PATENTS

| 1,230,535 | 4/1960 | France. |
| 12,636 | 6/1899 | Great Britain. |

RICHARD E. AEGERTER, *Primary Examiner.*